(12) United States Patent
Seo et al.

(10) Patent No.: US 9,749,953 B2
(45) Date of Patent: Aug. 29, 2017

(54) APPARATUS AND METHOD FOR CONTROLING POWER IN A SHORT-RANGE COMMUNICATION DEVICE

(71) Applicant: Samsung Electronics Co., Ltd., Gyeonggi-do (KR)

(72) Inventors: Kwang-Won Seo, Gyeonggi-do (KR); Young-Sin Moon, Gyeonggi-do (KR); Khi-Soo Jeong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/049,108

(22) Filed: Oct. 8, 2013

(65) Prior Publication Data
US 2014/0099889 A1    Apr. 10, 2014

(30) Foreign Application Priority Data
Oct. 8, 2012  (KR) .................. 10-2012-0111284

(51) Int. Cl.
*H04B 5/00* (2006.01)
*H04W 52/02* (2009.01)
*H04L 29/06* (2006.01)
*H04W 4/00* (2009.01)

(52) U.S. Cl.
CPC ...... *H04W 52/0225* (2013.01); *H04B 5/0031* (2013.01); *H04L 63/0492* (2013.01); *H04W 4/008* (2013.01); *H04W 52/028* (2013.01); *H04W 52/0229* (2013.01); *Y02B 60/50* (2013.01)

(58) Field of Classification Search
CPC .................................. H04B 5/02; H04B 5/00
USPC ............................................... 455/41.1, 41.2
See application file for complete search history.

(56) References Cited

U.S. PATENT DOCUMENTS

| 2004/0203384 | A1* | 10/2004 | Sugikawa | H04W 12/06 455/41.2 |
| 2005/0266798 | A1* | 12/2005 | Moloney | H04L 63/0435 455/41.2 |
| 2007/0135078 | A1* | 6/2007 | Ljung | H04B 5/0037 455/343.1 |
| 2007/0202807 | A1 | 8/2007 | Kim | |

(Continued)

FOREIGN PATENT DOCUMENTS

| JP | 2009-060526 | 3/2009 |
| KR | 20090056915 A | 6/2009 |
| KR | 20100075580 A | 7/2010 |

OTHER PUBLICATIONS

Bluetooth Special Interest Group, "Bluetooth Secure Pairing Using NFC", Application Document NFC Forum, NFC Forum-AD-BTSSP 1.0, Oct. 18, 2011, 32 pages.

(Continued)

*Primary Examiner* — April G Gonzales (57) ABSTRACT

An apparatus and method for controlling power in a short-range communication device are configured such that when the short-range wireless communication device is connected to a portable terminal by Near Field Communication (NFC), a link key request message requesting a link key is transmitted to the portable terminal, and upon receipt of a link key confirm message from the portable terminal in response to the link key request message, the short-range wireless communication device is powered on.

21 Claims, 6 Drawing Sheets

(56) References Cited

U.S. PATENT DOCUMENTS

| | | |
|---|---|---|
| 2008/0090520 A1 | 4/2008 | Camp et al. |
| 2009/0111376 A1* | 4/2009 | Kim .................... H04B 7/2606 |
| | | 455/9 |
| 2009/0111378 A1 | 4/2009 | Sheynman et al. |
| 2009/0144550 A1* | 6/2009 | Arunan ................ H04L 63/068 |
| | | 713/171 |
| 2009/0222659 A1* | 9/2009 | Miyabayashi ...... H04L 63/0823 |
| | | 713/156 |
| 2009/0227282 A1 | 9/2009 | Miyabayashi et al. |
| 2011/0028091 A1* | 2/2011 | Higgins .............. H04L 63/0492 |
| | | 455/41.2 |
| 2011/0313922 A1* | 12/2011 | Ben Ayed ............ G06Q 20/108 |
| | | 705/42 |
| 2012/0244855 A1 | 9/2012 | Ingaki et al. |

OTHER PUBLICATIONS

Written Opinion of the International Searching Authority dated Jan. 20, 2014 in connection with International Patent Application No. PCT/KR2013/008994, 5 pages.

International Search Report dated Jan. 20, 2014 in connection with International Patent Application No. PCT/KR2013/008994, 3 pages.

Extended European Search Report issued for EP 13187550.2 dated Mar. 29, 2016, 8 pgs.

\* cited by examiner

FIG.7

APPARATUS AND METHOD FOR CONTROLING POWER IN A SHORT-RANGE COMMUNICATION DEVICE

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Oct. 8, 2012 and assigned Serial No. 10-2012-0111284, the contents of which are incorporated herein by reference.

TECHNICAL FIELD

The present application relates to short-range wireless communication, and more particularly, to an apparatus and method for controlling power in a short-range wireless communication device.

BACKGROUND

Portable terminals such as smart phones and tablet PCs provide a variety of useful functions to users through various applications. Thus portable terminals are evolving into devices that can provide various types of information as well as voice calls by means of a number of functions. The functions of the portable terminals include especially a short-range wireless communication function that enables wireless communication with an external device within a short distance.

Short-range wireless communication is conducted by Bluetooth or infrared communication. The term 'external device' covers a number of devices including a headset, a keyboard, a mouse, a game console, a smart TV, etc.

When an external device is in power-on state, a portable terminal can attempt wireless communication with the external device. If the external device is connected wirelessly to another portable terminal, the portable terminal can attempt wireless communication with the external device after the external device releases the wireless connection from another portable terminal.

SUMMARY

To address the above-discussed deficiencies of the related art, it is a primary object to provide an apparatus and method for powering on by Near Field Communication (NFC) in a short-range wireless communication device.

Certain embodiments relate to an apparatus and method for receiving a link key by NFC and establishing a Bluetooth (BT) connection with a portable terminal using the received link key in a short-range wireless communication device.

Certain embodiments relate to a power control apparatus in a short-range wireless communication device, in which when a second NFC unit is connected to a first NFC unit of a portable terminal by NFC, the second NFC unit transmits a link key request message requesting a link key to the first NFC unit and, upon receipt of a link key confirm message from the first NFC unit in response to the link key request message, powers on the short-range wireless communication device.

Certain embodiments relate to an apparatus for controlling power of a short-range wireless communication device in a portable terminal, in which when a first NFC unit is connected to a second NFC unit of the short-range wireless communication device by NFC, the first NFC unit receives a link key request message from the second NFC unit and transmits a link key confirm message to the second NFC unit in response to the link key request message, and upon receipt of the link key request message from the first NFC unit, a first BT unit searches for a link key corresponding to the short-range wireless communication device in one or more pre-stored link keys and generates the link key confirm message based on a search result.

Certain embodiments relate to a power control method in a short-range communication device, in which when the short-range wireless communication device is connected to a portable terminal by NFC, a link key request message requesting a link key is transmitted to the portable terminal, and upon receipt of a link key confirm message from the portable terminal in response to the link key request message, the short-range wireless communication device is powered on.

Certain embodiments relate to a method for controlling power of a short-range wireless communication device in a portable terminal, in which when a portable terminal is connected to the short-range wireless communication device by NFC, a link key request message is received from the short-range wireless communication device, a link key corresponding to the short-range wireless communication device is searched for among one or more pre-stored link keys, and a link key confirm message is generated based on a search result and transmitted to the short-range wireless communication device by NFC.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system. Reference will be made to preferred embodiments of the present disclosure with reference to the attached drawings. A detailed description of a generally known function and structure of the present disclosure will be avoided lest it should obscure the subject matter of the present invention.

In accordance with certain embodiments of the present disclosure, the term 'portable terminal' covers a variety of terminals including a video call phone, a portable phone, a smart phone, an International Mobile Telecommunications 2000 (IMT-2000) terminal, a Wideband Code Division Multiple Access (WCDMA) terminal, a Universal Mobile Telecommunications System (UMTS) terminal, a Personal Digital Assistant (PDA), a Portable Multimedia Player (PMP), a Digital Multimedia Broadcasting (DMB) terminal, an e-book reader, a portable computer (e.g. a laptop or tablet), a digital camera, etc.

Figure 1:
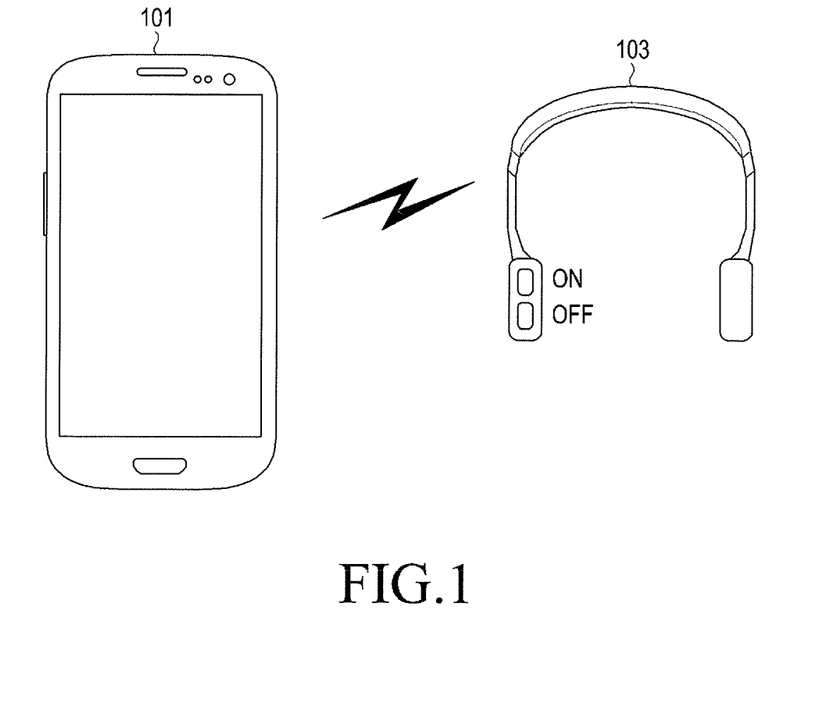
FIG. 1 illustrates a short-range wireless communication system according to an embodiment of the present disclosure.

FIG. 1 illustrates a short-range wireless communication system according to an embodiment of the present disclosure.

Referring to FIG. 1, the short-range wireless communication system includes a short-range wireless communication device 103 and a portable terminal 101. The short-range wireless communication device 103 is a device that provides a short-range wireless communication function. For example, the short-range wireless communication device 103 can be any of a headset, a keyboard, a mouse, a game console, and a smart TV.

The headset 103 provides Near Field Communication (NFC) functionality and Bluetooth (BT) functionality. When the headset 103 is in a power-off state, it can be turned on by the NFC functionality.

Specifically, when the headset 103 is connected to the portable terminal 101 by NFC, the headset 103 transmits a link key request (Link Key_REQ) message to the portable terminal 101 by NFC. The Link Key_REQ message, which is used to request a link key, includes a first command requesting a link key and an Identifier (ID) of the headset 103 or the first command, the ID of the headset 103, and a BT address of the headset 103 used for Bluetooth communication with the portable terminal 101.

The link key is a key used for a link between the headset 103 and the portable terminal 101. When the headset 103 is paired with the portable terminal 101, the link key is stored in memory units of the headset 103 and the portable terminal 101. The BT address is stored in the memory unit of the headset 103, when power-off of the headset 103 is requested. The ID of the headset 103 can be a Medium Access Control (MAC) address of the headset 103.

The headset 103 receives a link key confirm (Link Key_CNF) message from the portable terminal 101 in response to the Link Key_REQ message. The Link Key_CNF message includes a response result for the Link Key_REQ message. If the portable terminal 101 pre-stores the link key of the headset 103, the Link Key_CNF message can include the link key of the headset 103 and a second command indicating that the portable terminal 101 pre-stores the link key of the headset 103. On the contrary, if the portable terminal 101 does not preserve the link key of the headset 103, the Link Key_CNF message can include a third command indicating the absence of the link key of the headset 103 in the portable terminal 101.

The headset 103 powers on its BT unit for BT communication and determines whether the portable terminal 101 has the link key of the headset 103 by analyzing the Link Key_CNF message. The headset 103 makes the decision by checking the second or third command in the Link Key_CNF message.

If the headset 103 determines the absence of the link key in the portable terminal 101, the headset 103 establishes a BT connection with the portable terminal 101 in an Out Of Band (OOB) pairing. OOB pairing is for pairing with a specific device, for example, the portable terminal 101 in an out-of-band fashion. OOB pairing is defined in the Bluetooth standard and thus its description will not be provided herein.

On the other hand, if the headset 103 determines the presence of the link key of the headset 103 in the portable terminal 101, the headset 103 detects the link key from the Link Key_REQ message and compares the detected link key with one or more pre-stored link keys. If the detected link key is identical to any of the pre-stored link keys, the headset 103 establishes a BT connection with the portable terminal 101 using the detected link key. In contrast, if the detected key is identical to none of the pre-stored link keys, the headset 103 establishes a BT connection with the portable terminal 101 by OOB pairing.

The portable terminal 101 provides the NFC functionality and the BT communication functionality. When the headset 103 is powered off, the portable terminal 101 powers on the headset 103 by the NFC functionality.

To be more specific, when the portable terminal 101 is connected to the headset 103 by NFC, the portable terminal 101 receives the Link Key_REQ message from the headset 103 by NFC. Then the portable terminal 101 searches for a link key corresponding to the headset 103 in its memory unit, generates the Link Key_CNF message based on the search result, and transmits the Link Key_CNF message to the headset 103. If the portable terminal 101 pre-stores the link key of the headset 103, the portable terminal 101 configures the Link Key_CNF message so as to include the detected link key and the second command indicating the presence of the link key. On the contrary, if the portable terminal 101 does not have the link key, it configures the Link Key_CNF message so as to include the third command indicating the absence of the link key.

Subsequently, upon receipt of a connection request message from the headset 103, the portable terminal 101 establishes a BT connection with the headset 103 using the detected link key and transmits a connection confirm message to the headset 103. The connection request message requests a BT connection setup using the detected link key and the connection confirm message indicates that the BT connection has been established using the detected link key. On the other hand, upon receipt of an OOB pairing request message from the headset 103, the portable terminal 101 establishes a BT connection with the headset 103 by OOB pairing.

Figure 2:
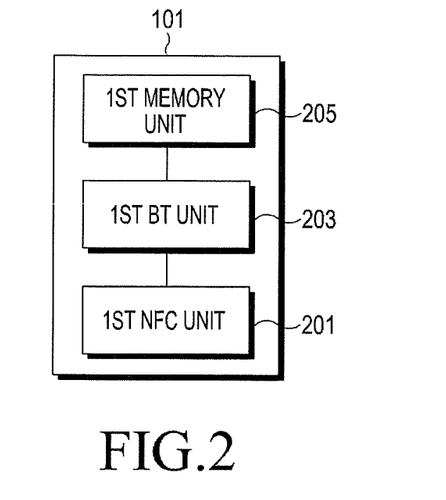
FIG. 2 is a block diagram of a portable terminal according to an embodiment of the present disclosure.

FIG. 2 is a block diagram of the portable terminal according to an embodiment of the present disclosure. Referring to FIG. 2, the portable terminal 101 includes a first NFC unit 201, a first BT unit 203, and a first memory unit 205. The first memory unit 205 includes a program memory and a data memory. The program memory stores a boot program and Operating System (OS) for controlling general operations of the portable terminal 101 and the data memory stores data generated during operations of the portable terminal 101. Especially, the first memory unit 205 pre-stores a plurality of link keys for a plurality of BT devices to which the portable terminal 103 was connected by BT. When the headset 103 and the portable terminal 101 are paired with each other, a link key is generated and stored in the memory units of the headset 103 and the portable terminal 101. For example, the memory unit 205 can store the following link keys listed in (Table 1).

TABLE 1

| BT Device | Link Key |
|---|---|
| ID of 1$^{st}$ BT device | Xxxx |
| ID of 2$^{nd}$ BT device | Yyyy |

The first NFC unit 201 provides the NFC functionality. Because the first NFC unit 201 operates using induced current, there is no need for supplying operation power to the first NFC unit 201. Particularly, the first NFC unit 201 monitors setup of an NFC connection to the headset 103. Upon setup of an NFC connection to the headset 103, the first NFC unit 201 determines whether a Link Key_REQ message has been received from the headset 103. Upon receipt of the Link Key_REQ message from the headset 103, the first NFC unit 201 transmits the Link Key_REQ message to the first BT unit 203.

The first NFC unit 201 receives a Link Key_CNF message from the first BT unit 203 in response to the Link Key_REQ message and transmits the Link Key_CNF message to the headset 130 by NFC.

The first BT unit 203 detects the ID of the headset 103 by analyzing the Link Key_REQ message and searches for a link key corresponding to the detected ID of the headset 103 among one or more pre-stored link keys corresponding to BT device IDs. Upon detection of the link key corresponding to the ID of the headset 103, the first BT unit 203 generates a Link Key_CNF message including the detected link key and the second command indicating the presence of the link key of the headset 103 in the portable terminal 101. On the other hand, if the link key corresponding to the ID of the headset 103 has not been detected, the first BT unit 203 generates a Link Key_CNF message including the third command indicating the absence of the link key of the headset 103 in the portable terminal 101.

The first BT unit 203 determines whether a connection request message has been received from the headset 103 by BT communication. The connection request message requests setup of a BT connection using the detected link key. Upon receipt of the connection request message, the first BT unit 203 establishes a BT connection with the headset 103 using the detected link key and transmits a connection confirm message to the first NFC unit 201. The connection confirm message indicates that the portable terminal 101 has established a BT connection using the detected link key.

If the first BT unit 203 has not received the connection request message, it determines whether an OOB pairing request message has been received. Upon receipt of the OOB pairing request message, the first BT unit 203 establishes a BT connection with the headset 103 by OOB pairing.

Figure 3:
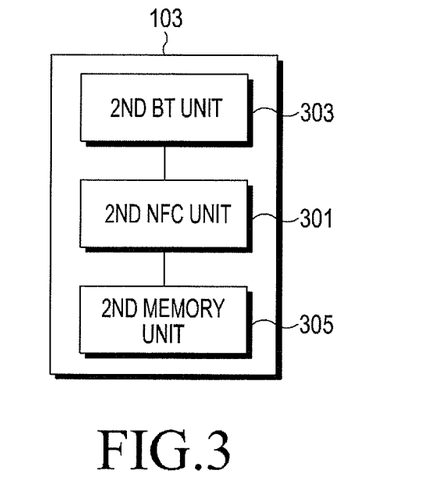
FIG. 3 is a block diagram of a headset according to an embodiment of the present disclosure.

FIG. 3 is a block diagram of the headset according to an embodiment of the present disclosure. Referring to FIG. 3, the headset 103 includes a second NFC unit 301, a second BT unit 303, and a second memory unit 305. The second memory unit 305 pre-stores the ID and BT address of the headset 193 and one or more link keys. When the headset 103 is paired with the portable terminal 101, a link key is stored in the memory units 305 and 205 of the headset 103 and the portable terminal 101. When power-off of the headset 103 is requested, the BT address of the headset 103 is stored in the second memory unit 305.

The second NFC unit 301 provides the NFC functionality. Because the second NFC unit 301 operates using induced current, there is no need for supplying operation power to the second NFC unit 301. Particularly, the second NFC unit 301 monitors setup of an NFC connection to the portable terminal 101. Upon setup of an NFC connection to the portable terminal 101, the second NFC unit 301 generates a Link Key_REQ message and transmits the Link Key_REQ message to the portable terminal 101 by NFC.

The second NFC unit 301 can detect the ID of the headset 103 from the second memory unit 305 and generate a Link Key_REQ message including the detected ID and the first command requesting a link key. Or the second NFC unit 301 can detect the ID and BT address of the headset 103 from the second memory unit 305 and generate a Link Key_REQ message including the detected ID, the detected BT address, and the first command.

The second NFC unit 301 receives a Link Key_CNF message in response to the Link Key_REQ message. The Link Key_CNF message includes a response result for the Link Key_REQ message. If the portable terminal 101 pre-stores a link key related to the headset 103, the Link Key_CNF message can include the link key and the second command indicating, the presence of the link key of the headset 103 in the portable terminal 101. On the other hand, if the portable terminal 101 does not have the link key of the headset 103, the Link Key_CNF message can include the third command indicating the absence of the link key of the headset 103 in the portable terminal 101.

The second NFC unit 301 transmits a power-on request message to the second BT unit 303 to turn on the second BT unit 303. After the second BT unit 303 is activated, the second NFC unit 301 transmits the received Link Key_CNF message to the second BT unit 303. Herein, the second NFC unit 301 turns on the second BT unit 303 by transmitting the power-on request message to a power supply (not shown) of the second BT unit 303.

The second BT unit 303 provides the BT functionality and is placed in power-off state. Especially when the second BT unit 303 is powered on by the power-on request message received from the second NFC unit 301, the second BT unit 303 activates the BT functionality. The second BT unit 303 receives the Link Key_CNF message from the second NFC unit 301 and determines whether the portable terminal 101 pre-stores the link key of the head set 103 by analyzing the Link Key_CNF message. Specifically, the second BT unit 303 determines whether the portable terminal 101 preserves the link key of the headset 103 by checking the second or third command in the Link Key_CNF message. If the second BT unit 303 determines that the portable terminal 101 does not preserve the link key of the headset 103, the second BT unit 303 establishes a BT connection with the portable terminal by OOB pairing.

On the other hand, if the second BT unit 303 determines that the portable terminal 101 pre-stores the link key of the headset 103, the second BT unit 303 detects the link key from the Link Key_CNF message and compares the detected link key with pre-stored one or more link keys. If the detected link key is identical to any of the pre-stored link keys, the second BT unit 303 establishes a BT connection with the portable terminal 101 using the detected link key. The second BT unit 303 transmits a connection request message and receives a connection confirm message in response to the connection request message.

The connection request message requests setup of a BT connection using the pre-stored link key of the headset 103. The connection confirm message indicates that the portable terminal 101 has established a BT connection using the pre-stored link key of the headset 103.

If the detected key is identical to none of the pre-stored link keys, the second BT unit 303 establishes a BT connection with the portable terminal 101 by OOB pairing.

Figure 4:
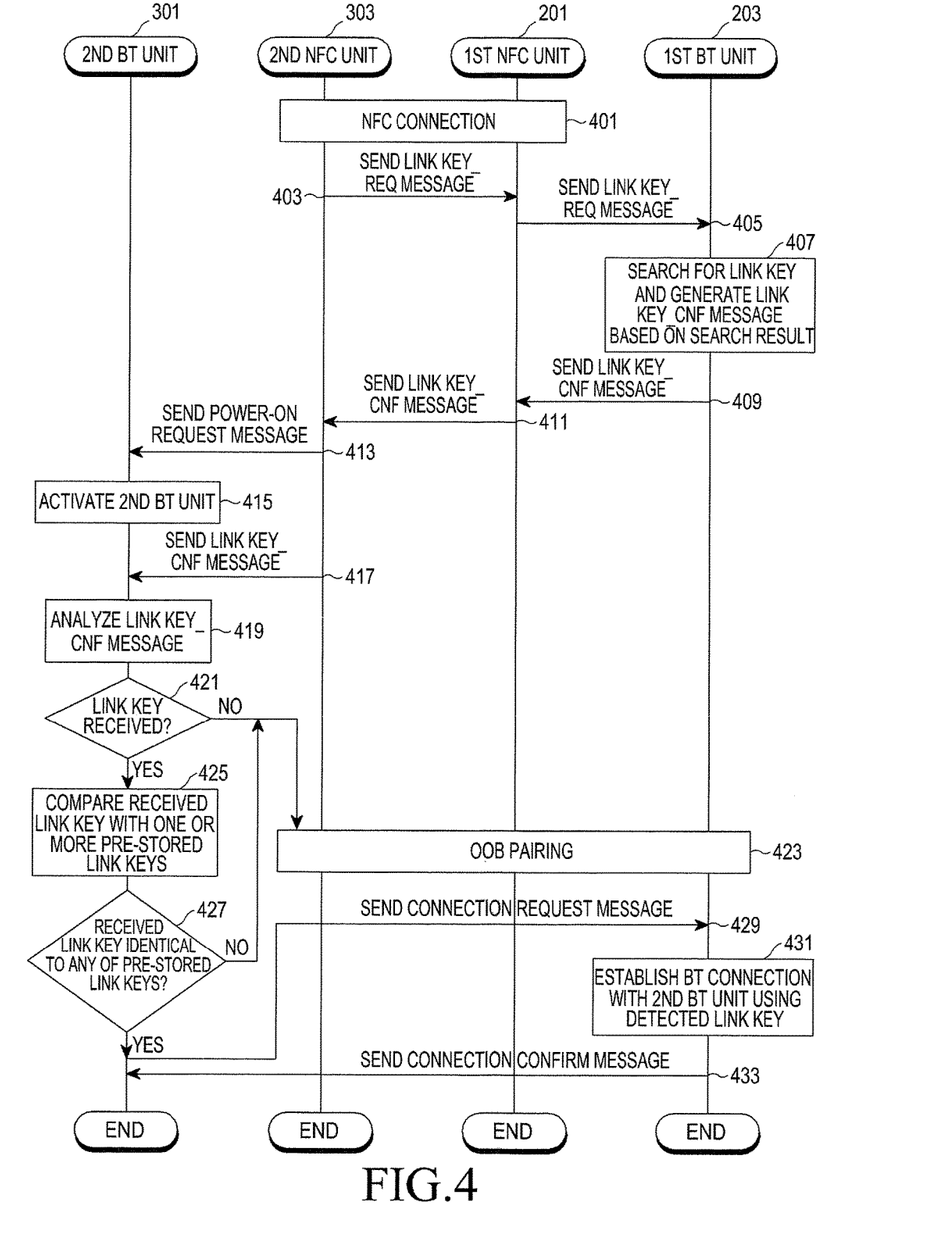
FIG. 4 illustrates a power control operation in the wireless communication system according to an embodiment of the present disclosure.

FIG. 4 is a flowchart illustrating a power control operation in the short-range wireless communication system according to an embodiment of the present disclosure.

Referring to FIG. 4, the second NFC unit 301 is connected to the first NFC unit 201 by NFC in block 401. In block 403, the second NFC unit 301 generates a Link Key_REQ message and transmits the Link Key_REQ message to the first NFC unit 201. Specifically, the second NFC unit 301 can detect the ID of the headset 130 from the second memory unit 305 and generate a Link Key_REQ message including the detected ID of the headset 103 and the first command requesting a link key. Alternatively, the second NFC unit 301 can detect the ID and BT address of the headset 130 from the second memory unit 305 and generate a Link Key_REQ message including the detected ID and BT address of the headset 103 and the first command.

The first NFC unit 201 receives the Link Key_REQ message and transmits the received Link Key_REQ message to the first BT unit 203 in block 405. In block 407, the first BT unit 203 searches for a link key based on the Link Key_REQ message received from the first NFC unit 201 and generates a Link Key_CNF message based on a search result.

Specifically, the first BT unit 203 detects the ID of the headset 130 from the Link Key_REQ message by analyzing the Link Key_REQ message and searches for a link key corresponding to the ID of the headset 130 among link keys pre-stored in the first memory unit 205. If the first BT unit 203 detects the link key corresponding to the ID of the headset 103 in the first memory unit 205, the first BT unit 203 generates a Link Key_CNF message including the detected link key and the second command indicating that the portable terminal 101 pre-stores the link key of the headset 130. On the contrary, if the first BT unit 203 fails in detecting the link key corresponding to the ID of the headset 103 in the first memory unit 205, the first BT unit 203 generates a Link Key_CNF message including the third command that the portable terminal 101 does not have the link key of the headset 103.

The first BT unit 203 transmits the Link Key_CNF message to the first NFC unit 201 in block 409 and the first NFC unit 201 transmits the received Link Key_CNF message to the second NFC unit 301 by NFC in block 411.

Upon receipt of the Link Key_CNF message from the first NFC unit 201 by NFC, the second NFC unit 301 powers on the second BT unit 303 by transmitting a power-on request message to the second BT unit 303 in block 413. Particularly, the second NFC unit 301 transmits the power-on request message to the power supply (not shown) of the second BT unit 303, thereby powering on the second BT unit 303.

In block 415, upon power-on, the second BT unit 303 activates its BT functionality. The second NFC unit 301 transmits the received Link Key_CNF message to the second BT unit 303 in block 417 and the second BT unit 303 determines whether the portable terminal 101 pre-stores the link key of the headset 103 by analyzing the Link Key_CNF message in block 419.

Specifically, the second BT unit 303 determines whether the link key has been received in the Link Key_CNF message by checking the second or third command included in the Link Key_CNF message. For example, in the presence of the second command in the Link Key_CNF message, the second BT unit 303 can determine that the link key has been received. In another example, if the Link Key_CNF message includes the third command, the second BT unit 303 can determine that the link key has not been received.

If determining that the link key has been received, the second BT unit 303 goes to block 425 and otherwise, the second BT unit 303 goes to block 423.

In block 423, the second BT unit 303 establishes a BT connection with the portable terminal 101 by OOB pairing. On the other hand, in block 425, the second BT unit 303 detects the link key in the Link Key_CNF message and compares the detected link key with one or more pre-stored link keys. If the detected link key is identical to any of the pre-stored link keys, the second BT unit 303 proceeds to block 429 and otherwise, it returns to block 423.

The second BT unit 303 transmits a connection request message to the first BT unit 203 by BT communication in block 429. The connection request message requests setup of a BT connection using the pre-stored link key of the headset 103.

Upon receipt of the connection request message, the first BT unit 203 establishes a BT connection with the headset 103 using the detected link key and transmits a connection confirm message to the second BT unit 201 in block 431. The connection confirm message indicates that the portable terminal 101 has established a BT connection using the pre-stored link key of the headset 103.

Figure 5:
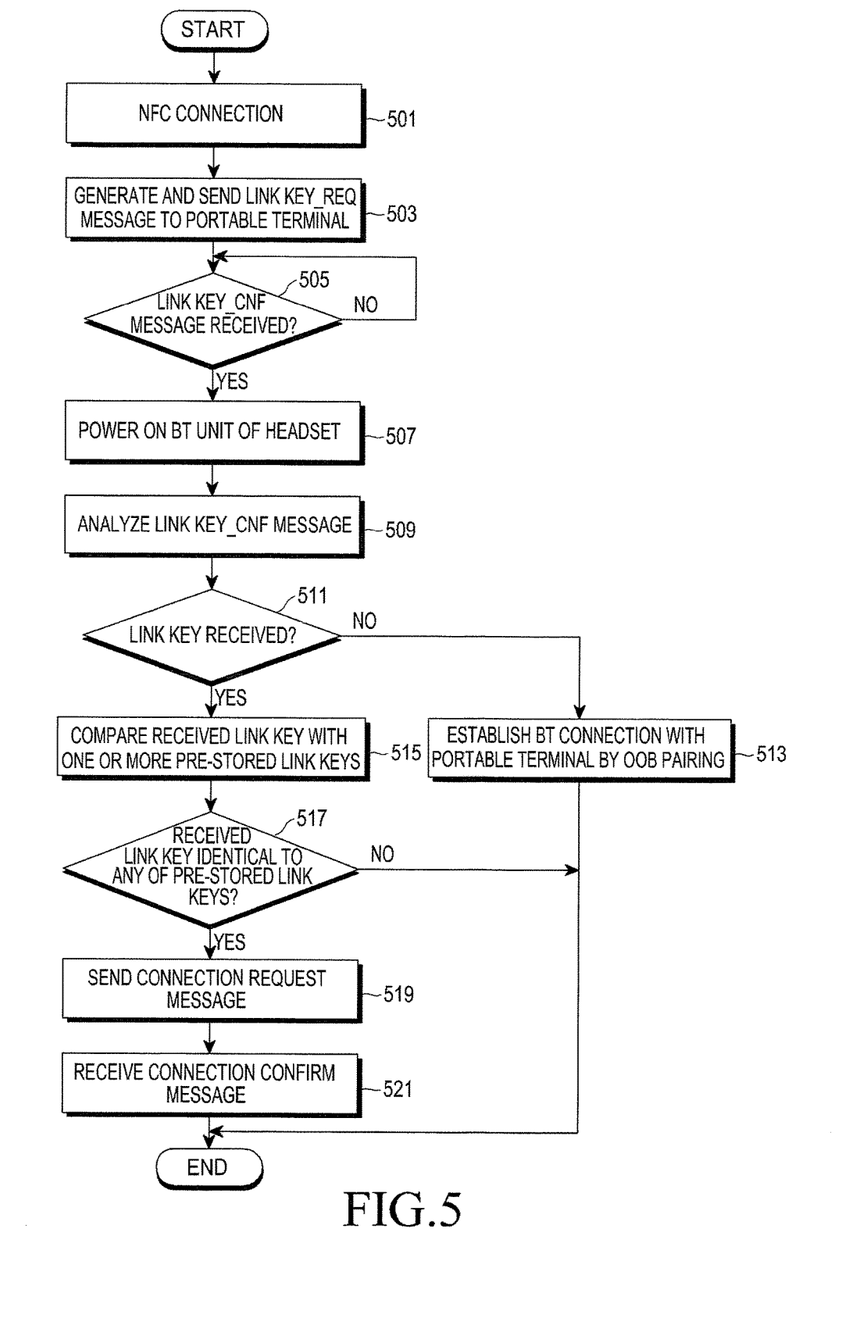
FIG. 5 illustrates a power control operation in the headset according to an embodiment of the present disclosure.

FIG. 5 illustrates a power control operation of the headset according to an embodiment of the present disclosure. Referring to FIG. 5, the headset 103 is connected to the portable terminal 101 by NFC in block 501. In block 503, the headset 103 generates a Link Key_REQ message and transmits the Link Key_REQ message to the portable terminal 101 by NFC. Specifically, the headset 103 can detect the ID of the headset 130 from the second memory unit 305 and generate a Link Key_REQ message including the detected ID of the headset 103 and the first command requesting a link key. Alternatively, the headset 103 can detect the ID and BT address of the headset 130 from the second memory unit 305 and generate a Link Key_REQ message including the detected ID and BT address of the headset 103 and the first command.

In block 505, the headset 103 determines whether a Link Key_CNF message has been received from the portable terminal 101 by NFC. Upon receipt of the Link Key_CNF message from the portable terminal 101, the headset 103 proceeds to block 507 and otherwise, the headset 103 repeats block 505.

The Link Key_CNF message includes a response result for the Link Key_REQ message. If the portable terminal 101 stores a link key related to the headset 103, the Link Key_CNF message can include the second command indicating the presence of the link key of the headset 103 in the portable terminal 101. On the contrary, if the portable terminal 101 does not store the link key of the headset 103, the Link Key_CNF message can include the third command indicating the absence of the link key of the headset 103 in the portable terminal 101.

In block 507, the headset 103 powers on the second BT unit 303 and activates its BT functionality. The headset 103 analyses the received Link Key_CNF message in block 509 and determines whether the link key has been received in the Link Key_CNF message in block 511.

If determining that the link key has been received, the headset 103 goes to block 515 and otherwise, the second BT unit 303 goes to block 513. Herein, the headset 103 determines whether the link key has been received in the Link Key_CNF message by checking the second or third command included in the Link Key_CNF message. For example, in the presence of the second command in the Link Key_CNF message, the headset 103 can determine that the link key has been received. In another example, if the Link Key_CNF message includes the third command, the headset 103 can determine that the link key has not been received.

In block 513, the headset 103 establishes a BT connection with the portable terminal 101 by OOB pairing. On the other hand, in block 515, the headset 103 detects the link key in the Link Key_CNF message and compares the detected link key with one or more pre-stored link keys. The headset 103 determines whether the detected link key is identical to any of the pre-stored link keys in block 517. If the detected link key is identical to any of the pre-stored link keys, the headset 103 proceeds to block 519 and otherwise, it goes to block 513.

The headset 103 transmits a connection request message to the portable terminal 101 by BT communication in block 519. The connection request message requests setup of a BT connection using the pre-stored link key of the headset 103.

The headset 103 receives a connection confirm message from the portable terminal 101 by BT communication in block 521. The connection confirm message indicates that the portable terminal 101 has established a BT connection using the pre-stored link key of the headset 103.

Figure 6:
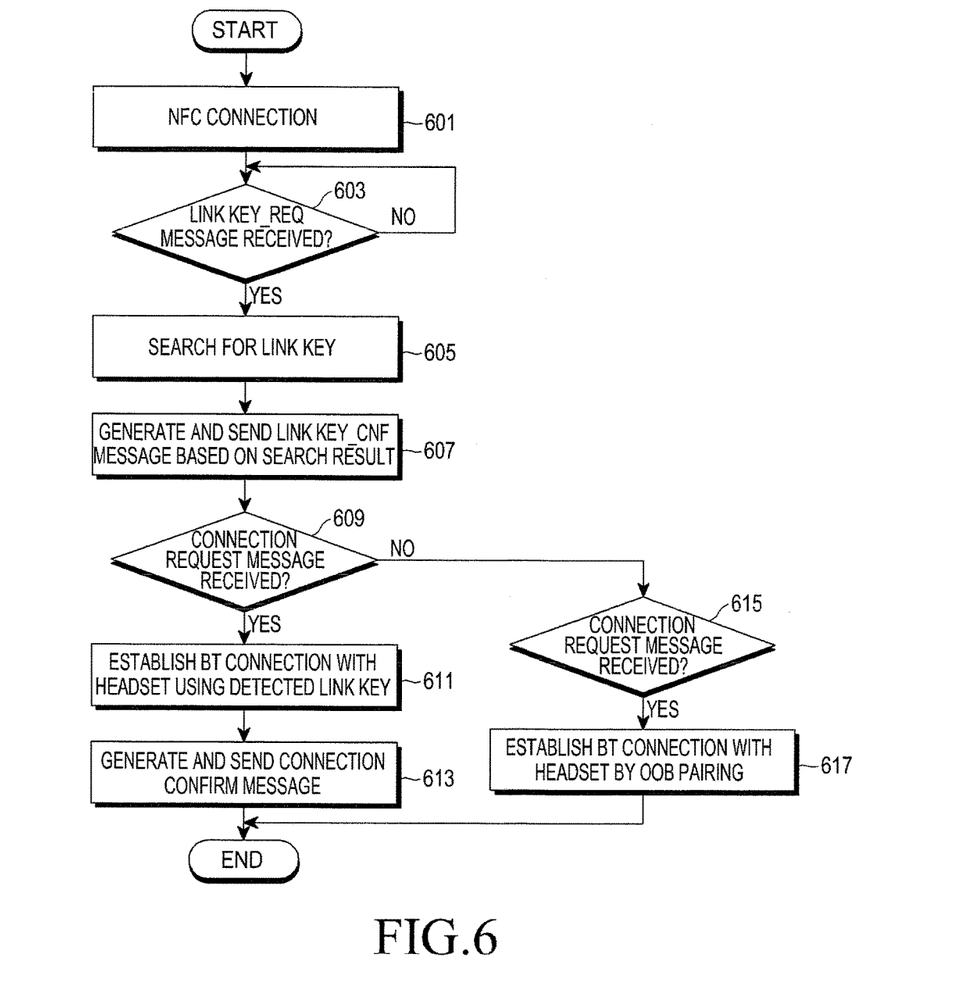
FIG. 6 illustrates an operation for controlling the power of the headset at the portable terminal according to an embodiment of the present disclosure.

FIG. 6 illustrates an operation for controlling the power of the headset at the portable terminal according to an embodiment of the present disclosure. Referring to FIG. 6, the portable terminal 101 is connected to the headset 103 by NFC in block 601. In block 603, the portable terminal 101 determines whether a Link Key_REQ message has been received from the headset 103 by NFC. The Link Key_REQ message is a message requesting a link key. The Link Key_REQ message can include the ID of the headset 103 and the first command requesting a link key or the ID and BT address of the headset 103 and the first command.

Upon receipt of the Link Key_REQ message, the portable terminal 101 goes to block 605 and otherwise, it repeats block 603. The portable terminal 101 searches for a link key based on the Link Key_REQ message received from the headset 103 in block 605 and generates a Link Key_CNF message based on a search result in block 607.

Specifically, the portable terminal 103 detects the ID of the headset 130 from the Link Key_REQ message by analyzing the received Link Key_REQ message, and searches for a link key corresponding to the ID of the headset 130 among link keys pre-stored in the first memory unit 205. If the link key corresponding to the ID of the headset 103 is detected from the first memory unit 205, the portable terminal 101 generates a Link Key_CNF message including the detected link key and the second command indicating that the portable terminal 101 pre-stores the link key of the headset 130. On the contrary, if the link key corresponding to the ID of the headset 103 is not detected from the first memory unit 205, the portable terminal 101 generates a Link Key_CNF message including the third command that the portable terminal 101 does not store the link key of the headset 103.

The portable terminal 101 determines whether a connection request message has been received from the headset 103 by BT communication in block 609. The connection request message requests setup of a BT connection using the pre-stored link key of the headset 103. Upon receipt of the connection request message, the portable terminal 101 goes to block 611 and otherwise, it goes to block 615.

The portable terminal 101 establishes a BT connection with the headset 103 using the detected link key in block 611. In block 613, the portable terminal 101 generates a connection confirm message and transmits the connection confirm message to the headset 103 by BT communication. The connection confirm message indicates that the portable terminal 101 has established a BT connection using the detected link key.

In block 615, the portable terminal 101 monitors receipt of an OOB pairing request message. Upon the OOB pairing request message, the portable terminal 101 goes to block 617 and otherwise, the portable terminal 101 ends communication with the headset 103. In block 617, the portable terminal 101 establishes a BT connection with the headset 103 by OOB pairing.

Figure 7:
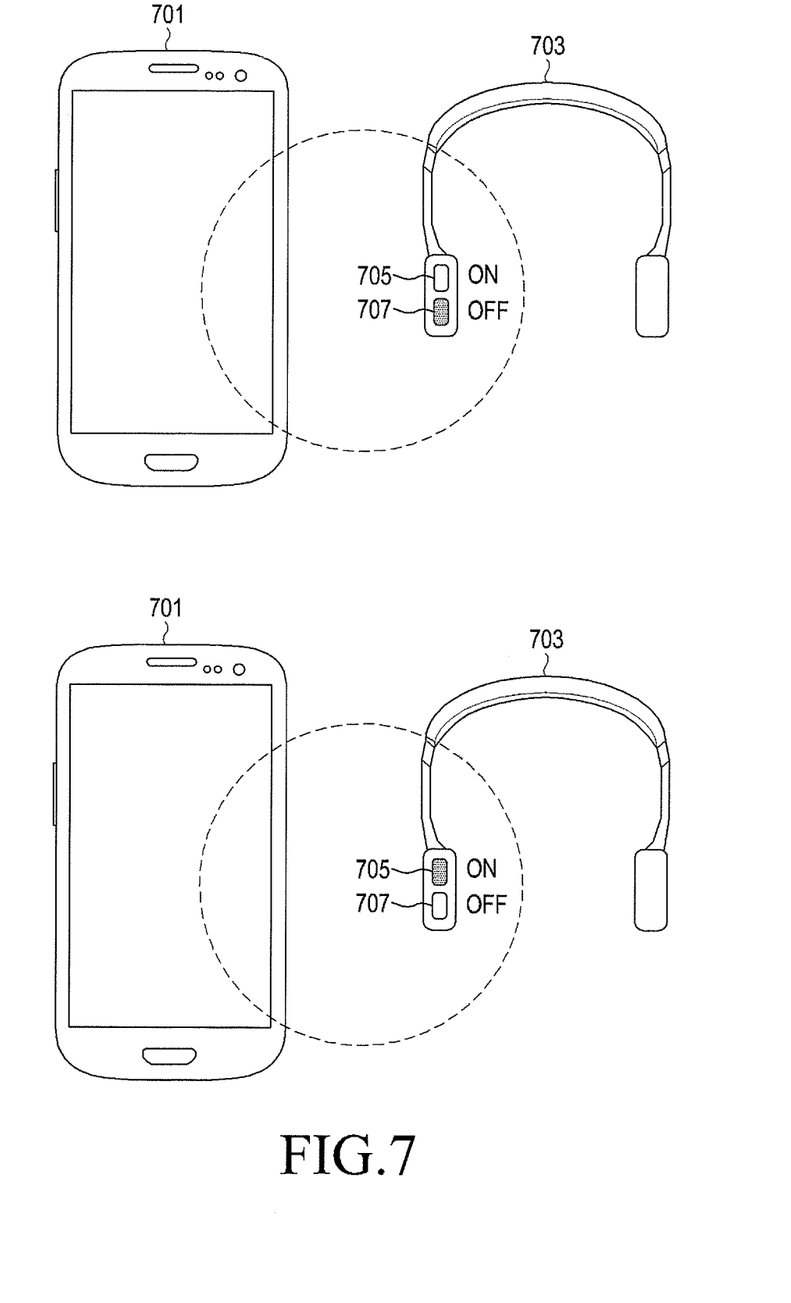
FIG. 7 illustrates a headset that is powered on according to an embodiment of the present disclosure.

FIG. 7 illustrates a headset that is powered on according to an embodiment of the present disclosure. Referring to FIG. 7, after a portable terminal 701 is connected to a headset 702 in power-off state 707 by NFC, the headset 703 is powered on as indicated by reference numeral 705. Specifically, the headset 703 transmits a Link Key_REQ message to the portable terminal 701 by NFC and receives a Link Key_CNF message from the portable terminal 701 by NFC in response to the Link Key_REQ message. Then the headset 703 is placed in the power-on state 705 and establishes a BT connection with the portable terminal 701 using a link key included in the Link Key_CNF message.

As is apparent from the above description, a short-range wireless communication device is powered on by NFC, thus increasing user convenience. The short-range wireless communication device receives a link key by NFC and establishes a BT connection with a portable terminal using the received link key. Therefore, user convenience is further increased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
a second Bluetooth (BT) unit configured to establish a BT connection with a first BT unit of a portable terminal; and
a second Near Field Communication (NFC) unit configured to:
transmit a link key request message, requesting a link key used for establishing the BT connection with the portable terminal, to the portable terminal if the second NFC unit is connected to a first NFC unit of the portable terminal by NFC while the electronic device is powered off, and
power on the electronic device upon receipt of a link key confirm message from the portable terminal in response to the link key request message.

2. The electronic device of claim 1, wherein the second NFC unit is configured to perform NFC using induced current as power.

3. The electronic device of claim 1, wherein the link key request message includes an Identifier (ID) of the electronic device.

4. The electronic device of claim 3, wherein the link key confirm message includes an instruction indicating whether the portable terminal includes a link key corresponding to the ID of the electronic device.

5. The electronic device of claim 1, wherein the BT connection is established using an included link key when the link key confirm message includes the link key.

6. The electronic device of claim 1, wherein the second BT unit is further configured to:
compare the link key with one or more pre-stored link keys; and
if the link key is identical to any of the pre-stored link keys, transmit a connection request message to the first BT unit.

7. An apparatus for controlling power of an electronic device, comprising:
a first Near Field Communication (NFC) unit configured to receive a link key request message, requesting a link key used for establishing a Bluetooth (BT) connection with the electronic device, from the electronic device, and to transmit a link key confirm message to the electronic device in response to the link key request message when the first NFC unit is connected to a second NFC unit of the electronic device by NFC while the electronic device is powered off; and
a first Bluetooth (BT) unit configured, upon receipt of the link key request message from the first NFC unit, to search for a link key corresponding to the electronic device in one or more pre-stored link keys and to generate the link key confirm message based on a search result,
wherein the electronic device is powered on upon receipt of the link key confirm message.

8. The apparatus of claim 7, wherein the NFC is performed using induced current as power.

9. The apparatus of claim 7, wherein the link key request message includes an Identifier (ID) of the electronic device.

10. The apparatus of claim 9, wherein the link key confirm message includes an instruction indicating whether a portable terminal includes a link key corresponding to the ID of the electronic device.

11. The apparatus of claim 7, wherein the first BT unit is configured to establish a BT connection with a second BT unit of the electronic device using detected link key upon receipt of a connection request message from the electronic device.

12. A power control method in an electronic device, comprising:
transmitting a link key request message, requesting a link key used for establishing a Bluetooth (BT) connection with a portable terminal via a BT unit, to the portable terminal when the electronic device is connected to the portable terminal by Near Field Communication (NFC) while the electronic device is powered off; and
powering on the electronic device, upon receipt of a link key confirm message from the portable terminal in response to the link key request message.

13. The power control method of claim 12, wherein NFC is performed using induced current as power.

14. The power control method of claim 12, wherein the link key request message includes an Identifier (ID) of the electronic device.

15. The power control method of claim 14, wherein the link key confirm message includes an instruction indicating whether the portable terminal includes a link key corresponding to the ID of the electronic device.

16. The power control method of claim 12, further comprising, when the link key confirm message includes a link key, establishing the BT connection with the portable terminal using the link key.

17. A method for controlling power of an electronic device in a portable terminal, comprising:
receiving a link key request message, requesting a link key used for establishing a Bluetooth (BT) connection with the electronic device, from the electronic device when the portable terminal is connected to the electronic device by Near Field Communication (NFC) while the electronic device is powered off;
searching for a link key corresponding to the electronic device among one or more pre-stored link keys and generating a link key confirm message based on a search result; and
transmitting the link key confirm message to the electronic device by NFC,
wherein the electronic device is powered on upon receipt of the link key confirm message.

18. The method of claim 17, wherein NFC is performed using induced current as power.

19. The method of claim 17, wherein the link key request message includes an Identifier (ID) of the electronic device.

20. The method of claim 19, wherein the link key confirm message includes an instruction indicating whether the portable terminal includes a link key corresponding to the ID of the electronic device.

21. The method of claim 17, further comprising, upon receipt of a connection request message from the electronic device, establishing a BT connection with the electronic device using detected link key.

* * * * *